Aug. 10, 1965    J. R. COFFING    3,199,207
ATTITUDE INDICATOR
Filed Feb. 20, 1961    5 Sheets-Sheet 1
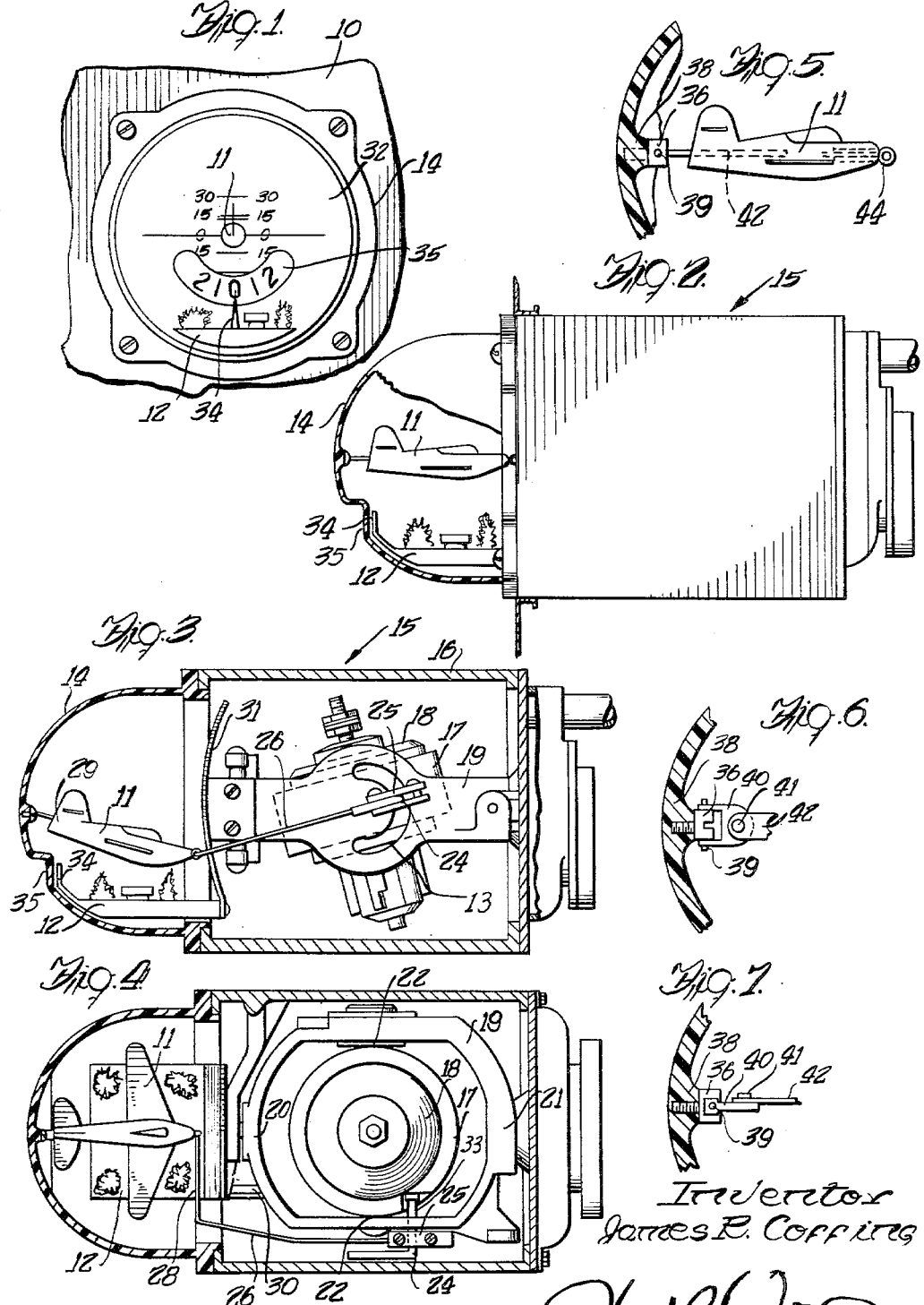
Inventor
James R. Coffing Aug. 10, 1965

J. R. COFFING 3,199,207

ATTITUDE INDICATOR

Filed Feb. 20, 1961

Inventor
James R. Coffing

Attorney

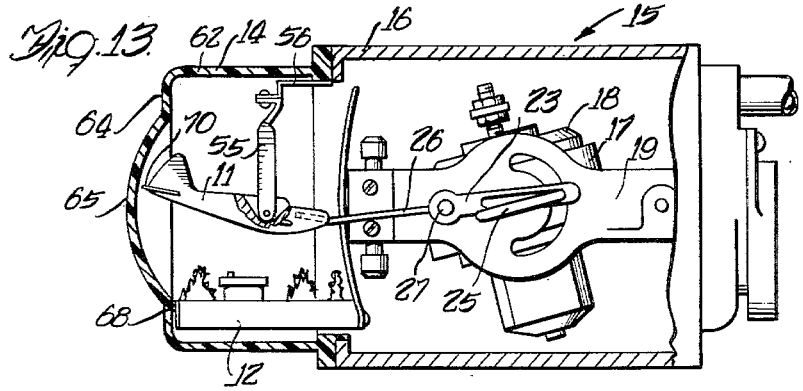
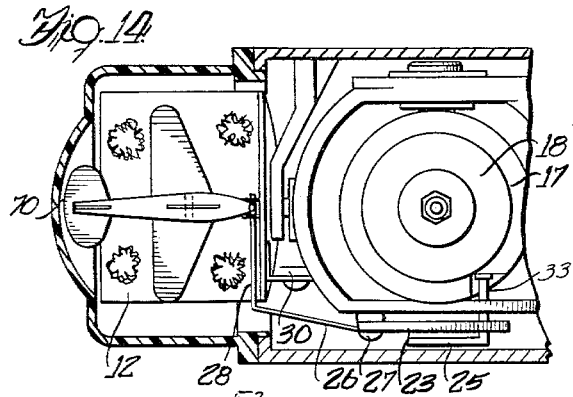
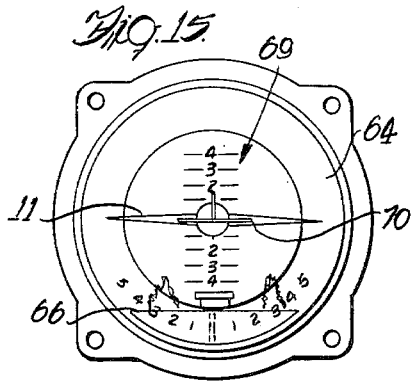
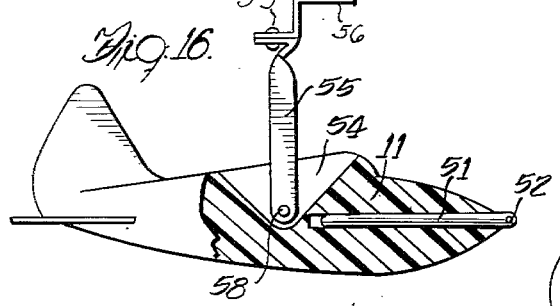
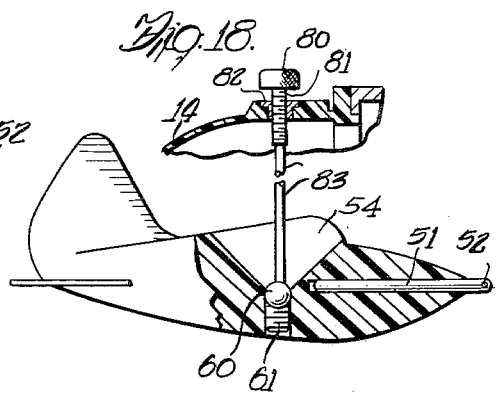
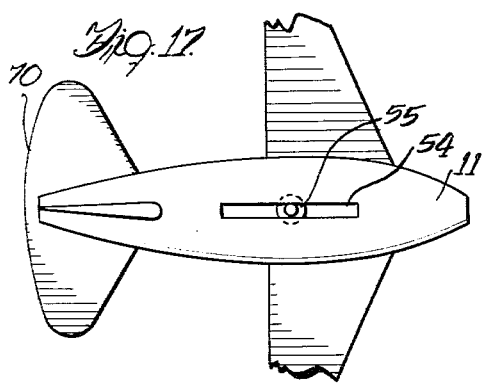

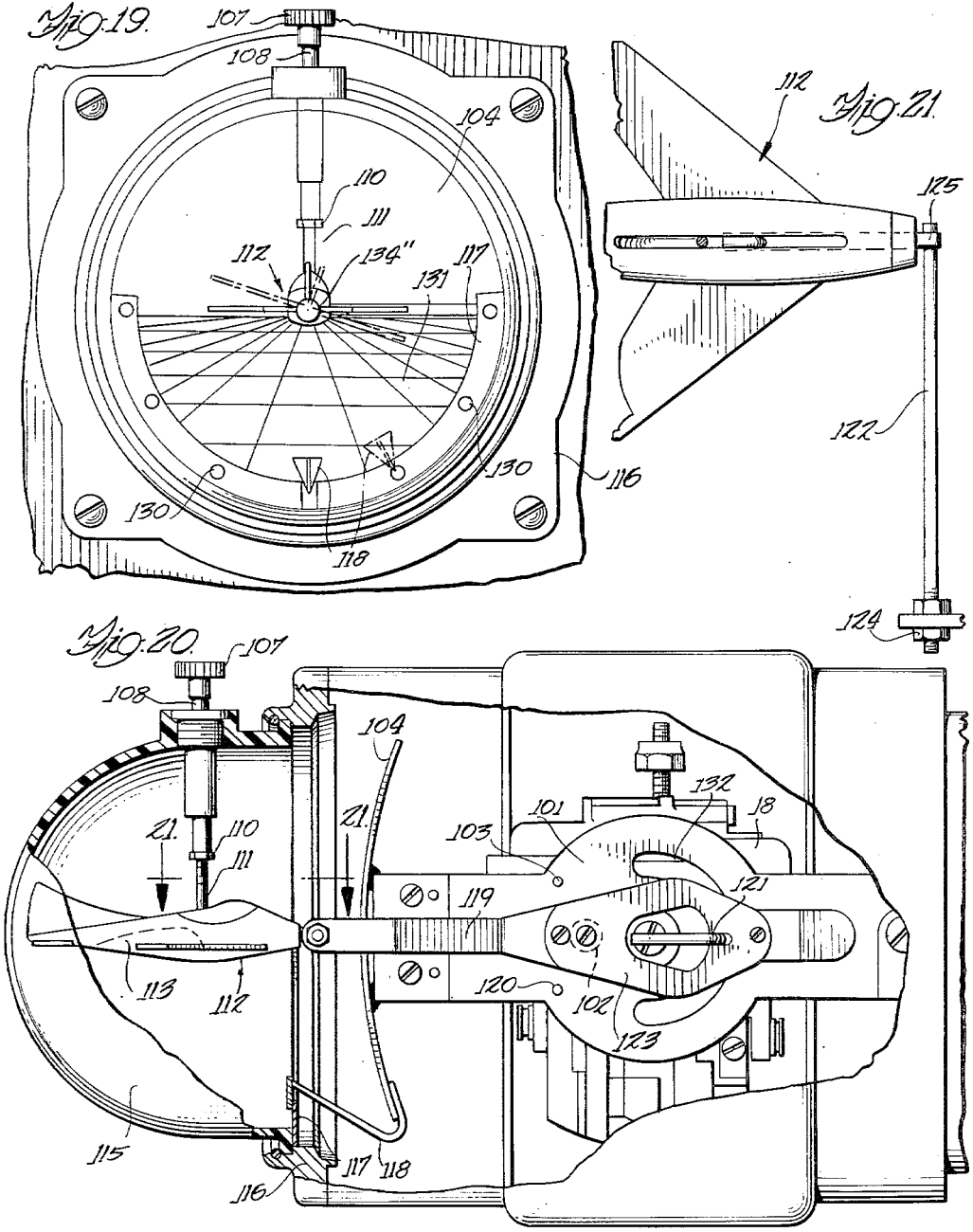

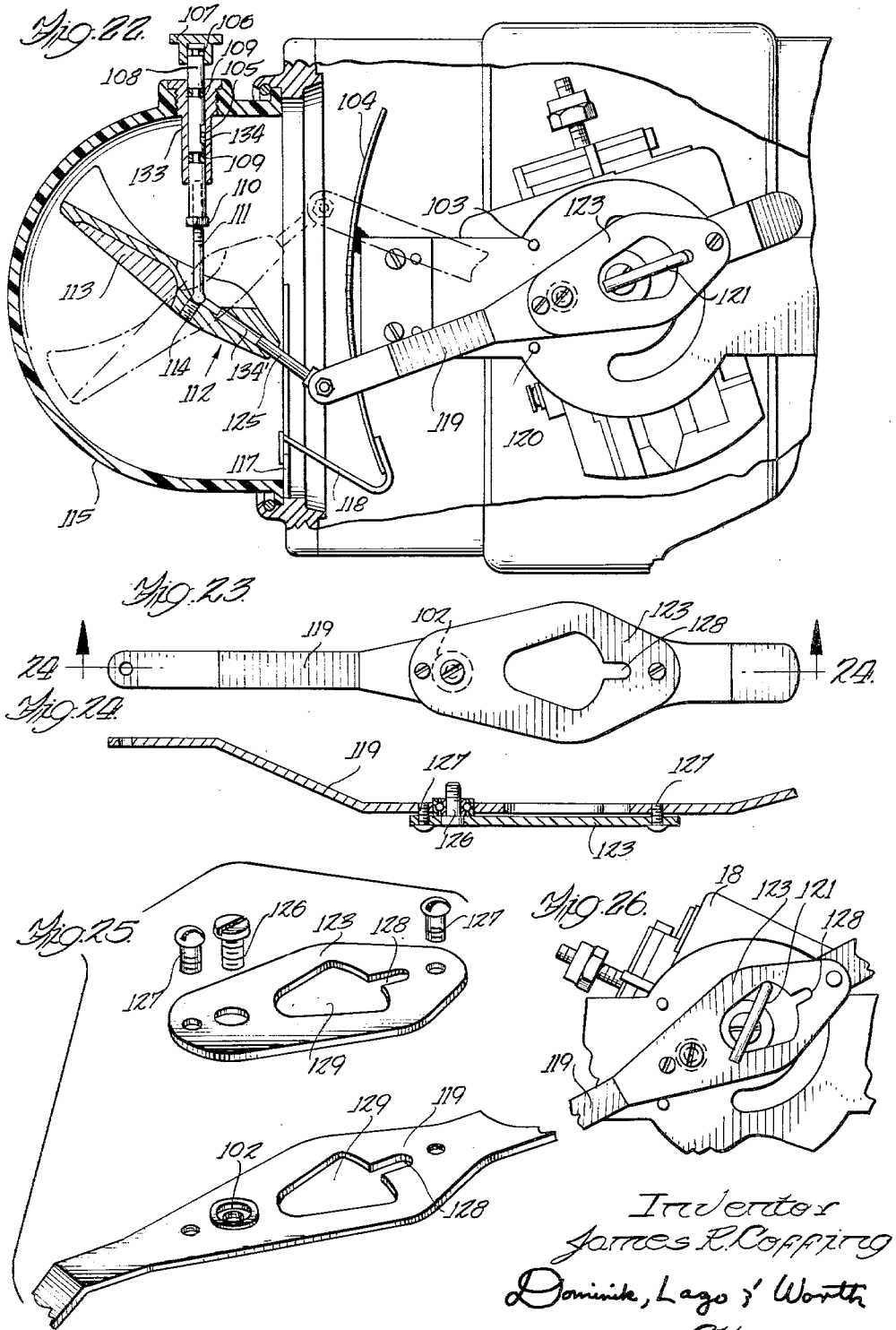

United States Patent Office 3,199,207
Patented Aug. 10, 1965

3,199,207
ATTITUDE INDICATOR
James R. Coffing, R.R. 2, Covington, Ind.
Filed Feb. 20, 1961, Ser. No. 91,298
5 Claims. (Cl. 33—204)

This invention is a continuation-in-part of the co-pending abandoned application on "Attitude Indicator," Serial No. 757,871, filed August 28, 1958.

The present invention relates to an attitude indicator which is a blind flying instrument intended for use in aircraft. More particularly, the invention relates to an attitude indicator with a three-dimensional presentation of pitch and bank which can be added to existing artificial horizon equipment at a modest cost.

The artificial horizon has become one of the basic flight instruments for use when flying blind; that is, when flight cannot be conducted with reference to the ground or any horizon but must be conducted solely by reference to the aircraft's instruments. In an artificial horizon of the type commonly installed in aircraft, a vacuum or electric motor driven gyroscope provides the horizon datum; that is, the reference from which all indications of deviation from straight and level flight are translated.

On the dial of the standard artificial horizon the position of the air craft silhouette is fixed, and the horizon bar moves as the aircraft deviates from straight and level flight. This reversal of relative motion proves confusing to the non-professional pilot on those rare occasions where he may be called upon to fly with reference to the instruments only.

Accordingly, it is the principal object of the present invention to provide a three-dimensional presentation of aircraft attitude in which a model aircraft moves with respect to a three-dimensional showing of the earth's surface in simulation of the movements of the aircraft.

A more detailed object of the invention is to furnish a three-dimensional attitude indicator in which numerical indications of pitch and bank can be read with a minimum of parallax error.

Another object of the invention is to provide a three-dimensional attitude indicator which uses a conventional artificial horizon as its foundation and hence can be employed as an economical modification of existing equipment.

Still another object of the invention is to provide a three-dimensional attitude indicator susceptible of exaggerated movement to aid the beginner in more easily detecting departures from straight and level flight.

A further object of the invention is to provide a three-dimensional attitude indicator which can accommodate extreme conditions of bank and pitch.

Further objects and advantages of the present invention will become apparent as the following description of an illustrative embodiment and modifications thereof are described, taken in conjunction with the accompanying drawings, in which:

FIG. 1 is a front elevation of an illustrative three-dimentional attitude indicator as it would appear to the pilot of an aircraft looking at the attitude indicator from a position facing the instrument panel.

FIG. 2 is a side view in partial section showing the attitude indicator and its associated drive mechanism, which is a conventional, but modified, artificial horizon.

FIG. 3 is a view similar to FIG. 2 but also showing the basic, artificial horizon broken away, and indicating the attitude of the model aircraft in a diving position.

FIG. 4 is a top view in partial section of the attitude indicator and artificial horizon shown in FIGS. 2 and 3.

FIG. 5 is an enlarged partially broken, partially sectioned, view diagrammatically illustrating the attachment of the miniature airplane to the inside of the plastic bubble at its rear portion and showing its connection for suspension at its front portion.

FIG. 6 is an enlarged partial section in top view of the hinge attachment attaching the rear portion of the model aircraft to the plastic bubble.

FIG. 7 is a side elevation in enlarged partial section of the hinge shown in FIG. 6.

FIG. 13 is a longitudinal, vertical section partially broken to illustrate a modified embodiment which provides for exaggerated pitch of the model aircraft and reading of the pitch and bank indicia directly off of the rear face of the instrument.

FIG. 14 is a top view of the structure shown in FIG. 13 in a partially broken horizontal section through the mechanism shown in FIG. 13.

FIG. 15 is a rear view of the model aircraft shown in FIGS. 13 and 14 illustrating its position in straight and level flight.

FIG. 16 is an enlarged partially broken section of the model aircraft shown in FIGS. 13 and 14 illustrating a swiveled joint for its attachment.

FIG. 17 is a top view, partially broken, of the miniature aircraft shown in FIG. 16.

FIG. 18 is a view similar to FIG. 16, but showing an alternative suspension mechanism for the model aircraft.

FIG. 19 is a front elevational view of an additional alternative embodiment of the subject attitude indicator.

FIG. 20 is a side view of the attitude indicator shown in FIG. 19, partially broken at the casing.

FIG. 21 is a top view, enlarged and partially broken of the miniature plane and its connecting elements taken generally along section line 21—21 of FIG. 20, FIG. 22 is a view similar to that shown in FIG. 20, but sectioned through the middle of the miniature aircraft and showing diagrammatically the attitude of the miniature aircraft corresponding to a climbing or diving position.

FIG. 23 is a front elevation of the pointer bar in assembled relationship with the cover plate.

FIG. 24 is a sectional view of the pointer bar taken along section line 24—24 of FIG. 23.

FIG. 25 is an enlarged, partially broken perspective exploded view of the pointer bar, cover plate, and associated bearing.

FIG. 26 is an enlarged, partially broken, view of the pointer bar in its assembled relation to the gyro similar to that shown in FIG. 22 but showing the gyro tipped at an extreme angle.

Figure 8:
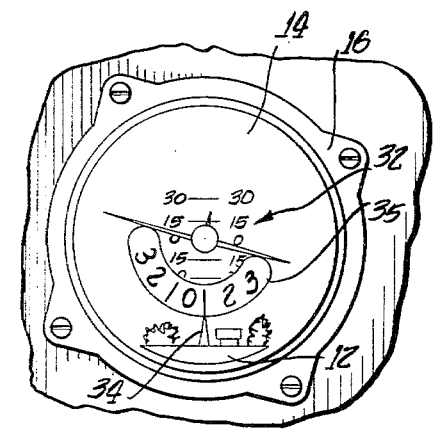
FIG. 8 illustrates the attitude indicator as shown in FIG. 1 except that the aircraft is banking to the right.
Figure 9:
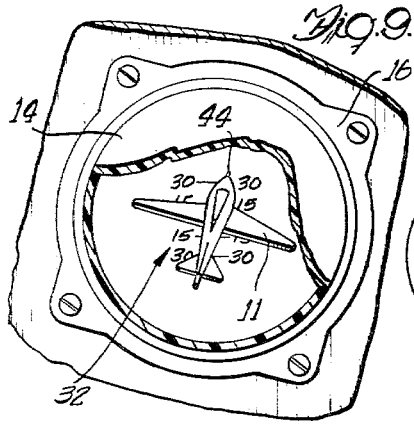
FIG. 9 is a partially broken view of the miniature aircraft and attitude indicator of FIG. 8 illustrating the aircraft in a climbing position as well as banking to the right.
Figure 10:
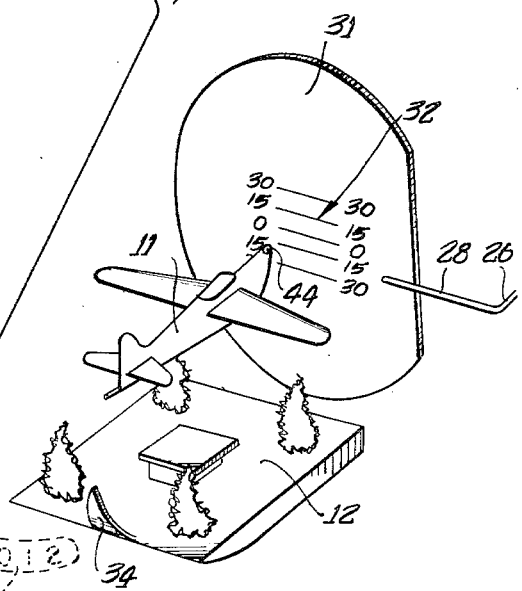
FIG. 10 illustrates diagrammatically how the numerical indicia of bank and climb are associated with the remainder of the attitude indicator for easy reading.

A three-dimensional attitude indicator 10, in order to properly guide the pilot for flight with reference to instruments, must be able to show the pilot whether he is climbing or diving, and whether he is banking to the left or to the right. As better shown in FIG. 2, the miniature aircraft 11, in straight and level flight, is oriented parallel with the miniature landscape or terrain reference 12 at the lower portion of the transparent viewing bubble 14. When the aircraft is diving toward the ground, the model airplane 11 moves into the attitude shown in FIG. 3. When the aircraft is banking to the right, the model aircraft moves into the position shown in FIG. 8. When the aircraft is climbing and banking to the right, the miniature aircraft appears in the position shown in FIG. 9. This action of the miniature aircraft 11 is attributable to the linkage with the artificial horizon to which it is attached, as well as the suspension of the miniature aircraft 11 within the bubble 14.

Referring now to FIGS. 3 and 4, it will be seen that the artificial horizon 15 contemplates a case 16 in which a rotor or gyroscope 18 is universally mounted. The gimbal ring 19 is pivoted at its forward portion 20 and its rear portion 21 to the casing 16. The rotor, which exhibits the gyroscopic action and tends to stay oriented with its axis of rotation perpendicular to the earth's surface, is pivoted at its two sides 22 to the gimbal ring 19. A caging lever 24 is provided on such an artificial horizon for the purpose of locking it in place when the aircraft is taxiing over rough ground, or otherwise undergoing maneuvers which might damage the artificial horizon. The caging lever 24 is round and "L" shaped, passing freely through the arcuate slot 13 in the gimbal ring 19. Since the caging lever 24 moves with the rotor case 17 because its end 33 is connected thereto, it can be used to affix a linkage which derives its intelligence from the rotor. The clamp or projection 25 will be observed to point its forward end downwardly when the aircraft in which the artificial horizon 15 is contained points downwardly.

By attaching a clampable arm 26 to the caging lever 24, and extending the clampable arm 26 by means of its L-shaped end 28, an attachment for the nose of the model aircraft is provided. The action of the arm 26 when attached to the miniature aircraft 11 which, in turn, is pivotally connected at its rear portion 29, is to make the miniature aircraft pitch in response to the pitch of the aircraft in which the instrument is mounted.

The miniature aircraft 11 itself does not bank, but the miniature landscape or terrain reference 12 banks with relation to the miniature aircraft 11 because the minialandscape 12 is fastened at its rear to a bracket 30 which, in turn, is secured to the gimbal ring 19. Thus, when the gimbal ring 19 moves to the left or the right with respect to the casing 16 of the artificial horizon, 15, a similar movement of the miniature landscape 12, identical with that of the horizon, is evidenced. A black background 31 is also secured to the miniature landscape 12.

As noted in FIG. 1, indicia of pitch 32 are provided on the background 31 so that the pilot may read his relative degree of climb or dive. To simultaneously read the degree of bank, a pointer 34 extends upwardly from the miniature landscape 12 and moves opposite banking indicia 35 which are positioned on a flat, crescent-shaped surface 35 at the lower portion of the plastic bubble 14.

As has been pointed out before, the miniature aircraft 11 is connected for vertical movement only. As will best be appreciated by comparing FIGS. 2 and 3, the relative distances between the nose and tail points of attachment vary as the miniature aircraft 11 pitches. For this reason, a sliding type attachment is required. Referring now to FIG. 5, it will be seen that the tail of the miniature aircraft is attached by means of a mounting screw 36 which is threaded into a boss 38 in the center of the plastic bubble 14. A transverse pin 39 extends through the mounting screw 36 and is secured to a yoke 40. The yoke 40, in turn, is attached by means of a yoke pin 41 to a tongue 42 which is secured to the inner portion of the miniature aircraft 11. The eye 44 at the front end of the miniature aircraft 11, fits within a mating tubular portion within the aircraft so that it can slip in and out of the fuselage body to accommodate the differing distances between the miniature aircraft attachment points when either climbing or diving.

Figure 11:
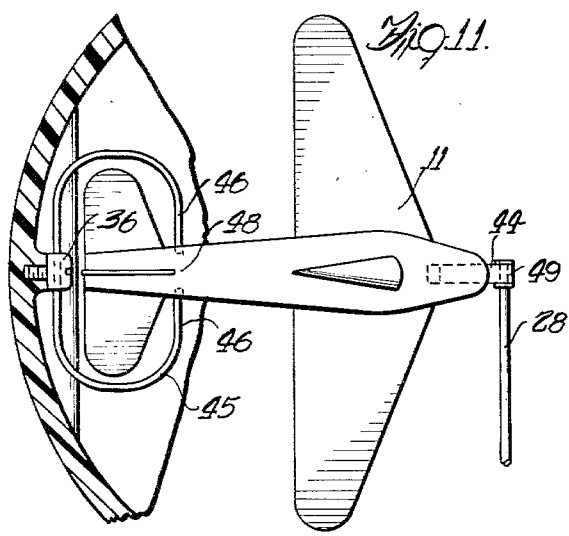
FIG. 11 is an enlarged top view of a modified form of attachment of the miniature aircraft within the attitude indicator which serves to exaggerate the degree of pitch.

An alternative means of attachment, when slightly exaggerated pitch is required, is shown in FIG. 11. There it will be seen that the miniature aircraft 11 is provided with an eye 44 which slips in and out of the fuselage of the miniature aircraft and is secured to the L-shaped cross bar of the clampable arm 26. At the rear, however, the mounting screw 36 pivotally receives a spring ring 45 which is interrupted in its forward portion to provide a pair of spring-loaded tongs or jaws 36 which engage small holes in the aircraft fuselage in opposed relation. With this type attachment, it will be observed that the pivot arm between the pivot axis 48 at the rear of the aircraft 11 and the pivot axis 49 at the front of the miniature aircraft, is shorter than the mechanism shown in FIGS. 5, 6 and 7, and accordingly a similar movement of the clamping bar extension 28 will provide a greater degree of pitch to the model aircraft 11.

Figure 12:
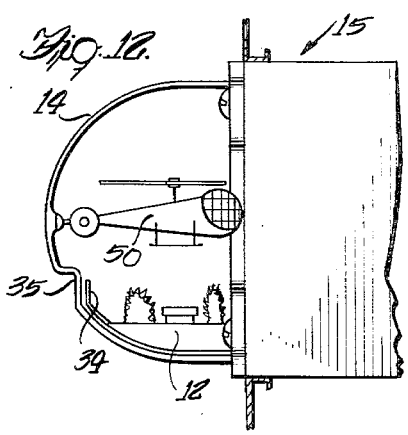
FIG. 12 illustrates in side elevation a modification of the attitude indicator for use with a helicopter.

In the event the attitude indicator is intended for use with a helicopter, the attachment means may remain the same, but a model helicopter 40, as shown in FIG. 12, is substituted for the model aircraft 11 shown previously.

A further modification is illustrated in FIGS. 13 through 18 wherein the miniature aircraft 11 is pivoted at a midportion in order to more greatly exaggerate its pitch movements, and to permit reading the graduations of pitch movements on the rear face of the plastic bubble 14 where the bank movements are also read.

Referring now to FIG. 13, it will be seen that the gimbal ring 19, rotor or gyroscope 18, and the swivel attachments are much the same as discussed previously. The arm 26 has a slotted end portion 23, the caging arm 25 slideably engaging the slotted end 23. The arm 26 is then pivoted at a mid-portion through pivot pin 27 secured to the gimbal ring 19. The caging arm 25 serves as the projection from which the arm 26 transmits pitch intelligence to the miniature aircraft 11.

As seen in FIG. 16, a slidable rod 51 is provided to telescope in and out of the forward portion of the fuselage of the miniature aircraft 11, and has a forward eye 52 which attaches to the clampable arm L-shaped end 28. The slidable rod 51, being round in nature and unkeyed with regard to its relationship to the fuselage, not only slides in and out of the fuselage, but is permitted to rotate with relationship thereto in order to accommodate the extremes of flight represented conditions. An elongated slot 54 is cut into the top portion of the miniature aircraft fuselage at its mid-section. In the embodiments shown in FIGS. 13 through 16, a flat support 55 is attached at its upper end by means of a bracket 56 to the casing 16 of the artificial horizon 15. At its lower end, the flat support is provided with a pin 58 which pivotally secures the support 55 to the miniature aircraft 11 so that the miniature aircraft can climb or dive, but is constrained against sidewise movement.

In an alternative embodiment, a round support rod 83, as shown in FIG. 18, may be atttached directly to the top of the bubble 14. The support rod 83 has a ball 60 at its lower end which abuts at its upper portion the side walls of the elongated slot 54 and which is secured at its lower portion by means of a cap screw 61. The support rod 83 being round, and having a diameter less than the width of the elongated slot 54, permits the aircraft to yaw from left to right when extreme conditions combining dive, climb, and bank are encountered in the manner outlined above which is accommodated also by the sliding relationship between the rod 51 and the miniature aircraft 11. The flat support 55 when employed accommodates these variances in view of its thin construction which permits a certain amount of play between the support 55 and the slot 54, and also by virtue of its swiveled attachment at its support portion by means of the rivet 53 to the bracket 56. In both the devices of FIGS. 16 and 17, as well as the one of FIG. 18, the movement of the miniature aircraft 11 is the same, the device with the ball joint, however, being preferred due to minimization of friction.

To permit adjustment of the miniature aircraft 11 to compensate for shifting trim in the main aircraft, in the embodiment shown in FIG. 18 it will be seen that support rod 83 has a threaded upper portion 81 and a knurled knob 80. By turning the knob 80, the threads 81 engage the threaded bushing 82 in the upper portion of the bubble 14 and permit the miniature aircraft 11 to be adjustably dived or climbed with relation to the landscape.

Because the plastic bubble 14 in the modified embodiments shown in FIGS. 13 through 18 has cylindrical side walls 62, a forward flat ring 64 is presented adjacent to the spherical convex portion 65 which accommodates the tail of the miniature aircraft 11. The ring 64 is provided at its lower portion with indicia 66 indicating bank. A marker 68 (see FIG. 13) is provided at the forward portion of the miniature landscape 12 and can be read through the plastic ring 64 and indicia 66 to determine the degree of bank. The pitch indicia 69 are placed on the rear face of the convex portion of the plastic cover 65, and are in close proximity with the rear edge 70 of the elevator of the miniature aircraft 11. In this manner parallax error in reading between the bank indicia 66 and the pitch indicia 69 are held to a minimum.

A further embodiment of the subject attitude indicator is shown in FIGS. 19 through 26 of the accompanying drawings. This attitude indicator has the terrain reference placed directly on the mask 104. The terrain reference 131, as seen in FIG. 19, is conveniently prepared from a pressure-sensitive decal which is pressed onto the mask 104 after the paint has been removed from the lower portion of the mask. It will be noted that the terrain reference 131 comprises a plurality of converging grid lines generally intersecting at a vanishing point at the center of the instrument, and along the longitudinal axis of the miniature aircraft 112. Horizontal lines parallel each other and intersecting the converging lines complete the fixed grid presentation.

As will be seen generally from FIG. 19, the miniature aircraft 112 can bank to either the left or the right, and as shown in FIG. 22, it can assume an attitude resembling climbing or diving. As the miniature aircraft banks to either the right or the left, the roll pointer 118 correspondingly moves to either the right or the left. That is, if the right wing drops to the position shown by the phantom lines in FIG. 19, the roll pointer 118 moves to the right to the position shown in phantom lines in FIG. 19. The degree of bank is measured by the bank indicia 130 which appear on the roll indicia border 117. The plastic bubble 115 is secured to the instrument by means of a bezel 116 as best illustrated in FIG. 20.

In FIG. 20 it will be seen that the miniature aircraft 112 is suspended inside of the plastic bubble 115, and contains (as shown in even more detail in FIG. 22) a balance putty 113 within the fuselage which is placed there in the course of manufacturing. The purpose of the balance putty 113 is to prevent excessive weight and thus friction on the pointer bar 119. Excessive friction at this point would cause precession of the gyro.

The miniature airplane is suspended by means of a knob 107 and adjustment shaft 108 to which a locknut 110 secures the adjustable unit with a protruding mounting shaft 111 extending below. The miniature aircraft 112 is coupled to the pointer bar 119 by means of a pair of lock nuts 124 as illustrated in FIG. 21. The attachment bar 122 pivotally engages a slidable connector 125, the slidable connector having an open eye at its forward portion, and the body being tubular in shape and fitting into a tubular recess 134' inside of the miniature aircraft 112. The connector 125 is constrained against lateral movement along bar 122 in the manner shown in FIG. 11 by an internal collar not shown.

The pointer bar 119 pivots about the bearing 102, and is limited in its travel by means of stop pins 103, 120 which are positioned on the gimbal ring 101. The gimbal extension 121 rides inside of the extension guide which is a crescent-shaped recess in the side of the gimbal ring 101.

Referring now in greater detail to the construction as shown in FIG. 22, it will be seen that the miniature aircraft can be adjusted vertically by means of moving the adjustment knob 107 up or down. The adjustment knob 107 is secured to the adjustment shaft 108 by means of a roll key 106 which rests within a shoulder at the upper portion of the adjustment shaft 108. A pair of O-rings 109 fit in spaced collars along the adjustment shaft 108, and snugly abut up against the adjustment shaft sleeve 133. A further roll pin travel limit 105 passes through the adjustment shaft sleeve 133, and rides up against a limit flat 134 which is on the face of the adjustment shaft 108. This construction effectively limits the movement of the pitch adjustment to a plus or minus 7½° for best operation.

The mounting shaft, as seen in FIG. 22, is threaded at its upper portion and threadedly engages the lower portion of the adjustment shaft 108. A lock nut 110 is employed to lock the extended relationship between the mounting shaft 111 and the adjustment shaft 108 which is set at the factory, and which assists in compensating for the various inaccuracies and tolerances in the gyroscope which is employed for the subject attitude indicator. It will be observed that the lower end of the mounting shaft 111 has a ball which fits within a slot in the upper portion of the miniature aircraft 112, and is confined in place by means of set screw 114.

As the plane of the rotor 18 remains horizontal, but the host aircraft moves up or down, the pointer bar 119 similarly moves up or down as shown in FIG. 22. For most positions of climb or dive in normal maneuvering, the rotor extension 121 will rest within the normal travel notch 128 of the pointer bar 119 and the guide plate 123 (see FIG. 23). When an extreme position of climb or dive is met, the gimbal extension 121 then migrates out of the normal travel notch 128 into the extreme position recess 129 as illustrated in FIG. 26. The extreme position recess 129 and normal travel notch 128 are shown in their disassembled relationship in FIG. 25. So long as an extreme position is not reached, the pointer bar 119 moves in unison as pivoted by the gimbal extension 121, but after the extreme position is reached, the extension 121 then moves within the extreme position recess and the miniature aircraft retains its position within the plastic bubble 115. Ultimately, the movement of the pointer bar 119 is restrained by means of the stop pins 103, 120.

It will appreciated that extreme sensitivity is required in an instrument of this nature. For this reason, a miniature bearing 102 is mounted along the pointer bar 119, but held in position by means of the guide plate 123. The guide plate 123 is secured to the pointer bar 119 by means of attachment screws 127. A pivot 126, in the form of a threaded bolt, passes through the interior portion of the bearing 102 and then threadedly engages the pre-threaded hole along the side of the gimbal ring, thereby permanently fixing the pointer bar for pivot with relation to the gimbal ring. An additional limitation for the travel is provided by means of the ends of the extension guide 132 which do not permit the rotor extension 121 to pass through an arc greater than 180°.

The embodiment as shown in FIGS. 19 through 26 presents an aircraft standing out in space within the airplane cockpit, the motion of which is related to a terrain reference placed on a flat surface forward of the aircraft. At the rear of the glass or plastic bubble, a target is provided in the form of an "O" with a pair of horizontal lines, the target being generally designated as 134." As the aircraft moves up or down, the horizontal stabilizer moves in or out of the hole in the center of the target, and the pilot in turn finds that he can maintain a level attitude with far more accuracy with this type of instrument, than any other artificial horizon since the relationship between the rear end of the aircraft and the target 134" is almost like that with the target on the peep sight of a rifle, as contrasted with the open sight which is commonly found in conventional artificial horizons. The linkage between the rotor extension 121 and the tail of the miniature aircraft 112 is placed so as to exaggerate the pitch movement of the aircraft 15% greater than that of the old standard gyro horizon. This gives faster reference to change in pitch movement. The relationship between the gimbal ring and extreme position recess as well as the normal travel notch is such to permit extensive maneuvers within the aircraft without tumbling the gyro, and yet still showing the user realistically the attitude of his aircraft. The adjustment mechanism permits the adjustment of the miniature aircraft in flight to accurately convey the level attitude, the adjustment being frictionally engaged so that extreme accuracy can be maintained at all times. Finally, the roll pointer and the roll pointer indicia are so co-ordinated to give a realistic and direct reading of the bank of the aircraft.

In review, it will be seen that an artificial horizon can be modified to provide a three-dimensional pictorial representation to the pilot as to how his aircraft is behaving with reference to the ground. The novice pilot immediately senses a feeling of proper perspective upon entering instrument conditions, and this confidence assists him in fighting off tendencies to develop vertigo. Because the modification can be readily attached to existing aircraft artificial horizons, it can offer the advantages of safety and confidence at a modest cost to the aircraft owner.

Although a particular embodiment of the invention has been shown and described in full here, there is no intention to thereby limit the invention to the details of such embodiment. On the contrary, the intention is to cover all modifications, alternative embodiments, usages and equivalents of the attitude indicator as fall within the spirit and scope of the invention, specification, and appended claims.

I claim:

1. A three-dimensional attitude indicator for use with an artificial horizon having a gyroscope for its main datum, the gyroscope having a fore and aft pivoted gimbal ring, the gyroscope being pivoted laterally within the gimbal ring, a projection extending laterally from the gyroscope and externally of the gimbal ring, said attitude indicator comprising, in combination, a transparent bubble, means attaching the transparent bubble to the face of the artificial horizon, a terrain simulating reference fixed to the gimbal ring and located at the lower portion of the bubble, said terrain reference including converging vertical lines and horizontal lines to represent a perspective fixed grid system similar to section lines, road networks, and fences as seen from the air, a miniature aircraft, means pivoting said miniature aircraft within the bubble to assume an attitude of climb or dive with relation to the terrain reference, lever means secured to the gyroscope projection, means pivotally connecting the lever means to the front of the miniature aircraft so that the latter assumes an attitude of climb and dive with respect to the terrain reference as the aircraft in which the attitude indicator is used climbs and dives with respect to the earth, the pivot means including longitudinal and rotatable sliding means with respect to the miniature aircraft to accommodate an extension of the distance between the miniature aircraft pivot points.

2. A three-dimensional attitude indicator comprising, in combination, a casing, a gyroscope within the casing, a gimbal ring, means laterally pivoting the gyroscope within the gimbal ring, means pivoting the gimbal ring fore and aft within the casing, lever means attached to the gyroscope and extending forwardly, a transparent bubble at the front of the casing, a miniature aircraft pivoted within the casing to assume an attitude of climb and dive, said lever attached to said gyroscope being pivoted to the gimbal ring at a mid-portion, a first end of the lever being pivotally connected to the nose of the miniature aircraft, means extending laterally from the gyroscope and aft of the gyroscope lateral pivot axis, said extending means being engaged with a second end of the lever, said miniature aircraft being pitched responsive to the relative pitch between the gyroscope and the gimbal ring, a terrain simulating reference secured to the gimbal ring and located in the lower portion of the bubble, said terrain reference including converging vertical and horizontal parallel lines to simulate a fixed grid in perspective, the whole in such combination that the miniature aircraft assumes an attitude of climb, dive, and bank with respect to the terrain reference in the same relationship as the aircraft using the attitude indicator climbs, dives, and banks with respect to the earth.

3. A three-dimensional attitude indicator for use with an artificial horizon having a gyroscope and an extending projection for its main datum, the gyroscope having a fore and aft pivoted gimbal ring, the gyroscope being pivoted laterally within the gimbal ring, the projection being free to pitch as the gyroscope pitches, said attitude indicator comprising, in combination, a transparent bubble, means attaching the transparent bubble to the face of the artificial horizon, a terrain reference fixed to the gimbal ring and having a fixed grid thereon, a miniature aircraft, means depending from the upper portion of said bubble pivotally supporting the miniature aircraft at a mid-portion thereof permitting the miniature aircraft to assume an attitude of climb or dive with reference to the terrain, a lever pivotally secured to the gimbal ring at a point between the gyroscope projection and the miniature aircraft, first means on said lever for pivoting the same responsive to movements of the gyroscope projection, second means at the other end of the lever pivotally connected to the front of the miniature aircraft, said second means including a member perpendicular with the lever, and a swivel at the front of the miniature aircraft pivotally connected to the perpendicular member, the whole in such combination that the sensitivity of the miniature aircraft movements with relation to the host aircraft may be varied both by the orientation of the miniature aircraft suspension and the lengths of the lever on either side of the pivot.

4. A three-dimensional attitude indicator for use with an artificial horizon having a gyroscope and a projection therefrom for its main datum, the gyroscope having a fore and aft pivoted gimbal ring, the gyroscope being pivoted laterally within the gimbal ring, the projection being free to pitch as the gyroscope pitches, said attitude indicator comprising, in combination, a transparent bubble, means attaching the transparent bubble to the face of the artificial horizon, a terrain simulating reference fixed to the gimbal ring including a fixed grid representation, a miniature airplane, having a cylindrical tunnel in its forward portion alined along the longitudinal axis of the miniature airplane, means depending from the upper portion of said bubble pivotally supporting the miniature airplane at a mid-portion thereof permitting the miniature airplane to assume an attitude of climb or dive with reference to the terrain, a lever pivotally secured to the gimbal ring at a point between the gyroscope projection and the miniature airplane, first means on said lever for pivoting the same responsive to movements of the gyroscope projection, second means at the other end of the lever pivotally connected to the front of the miniature airplane, said second means including a bar attached to the lever, and a slideable connector slideably engaging the bar and extending slideably into the miniature airplane forward tunnel.

5. A three-dimensional attitude indicator for use with an artificial horizon having a gyroscope and an extending projection for its main datum, the gyroscope having a fore and aft pivoted gimbal ring, the gyroscope being pivoted laterally within the gimbal ring, the projection being free to pitch as the gyroscope pitches, said attitude indicator comprising, in combination, a transparent bubble, means attaching the transparent bubble to the face of the artificial horizon, a terrain simulating reference fixed to the gimbal ring including a fixed grid thereon, a miniature airplane, means depending from the upper portion of said bubble pivotally supporting the miniature airplane at a midportion thereof permitting the miniature airplane to assume an attitude of climb or dive with reference to the terrain, said means including a frictionally engaged adjustment shaft, a lever pivotally secured to the gimbal ring at a point between the gyroscope projection and the miniature airplane, first means on said lever for pivoting the same responsive to movements of the gyroscope projection, second means at the other end of the lever pivotally connected to the front of the miniature airplane, the whole in such combination that the sensitivity of the miniature airplane movements with relation to the host aircraft may be varied both by the orientation of the miniature airplane suspension and the lengths of the lever on either side of the pivot.

References Cited by the Examiner

UNITED STATES PATENTS

| | | | |
|---|---|---|---|
| 2,008,833 | 7/35 | Lorelli | 33—215.2 |
| 2,128,956 | 9/38 | Moss | 33—204.2 |
| 2,170,087 | 8/39 | McPherson | 33—204 |
| 2,326,835 | 8/43 | Carter | 33—204.2 |
| 2,415,707 | 2/47 | Savage | 33—204.2 |
| 2,485,552 | 10/49 | Aumuller | 33—204.2 |
| 2,487,809 | 11/49 | Hoover et al. | |
| 2,515,199 | 7/50 | Draper | 33—204.2 |
| 2,524,745 | 10/50 | Adkins | 33—204.2 |
| 2,747,293 | 5/56 | Lyons | 33—204.2 |
| 3,037,382 | 6/62 | Aid et al. | 73—178 |

FOREIGN PATENTS

| | | |
|---|---|---|
| 1,205,406 | 8/59 | France. |

OTHER REFERENCES

D. G. Aid and C. Susskind: "Displaying Integrated Instrumentation," Electronic Industries, July 1958, pp. 68–71.

ROBERT B. HULL, *Primary Examiner.*